(12) United States Patent
Couvert et al.

(10) Patent No.: US 8,046,503 B2
(45) Date of Patent: Oct. 25, 2011

(54) DMA CONTROLLER, SYSTEM ON CHIP COMPRISING SUCH A DMA CONTROLLER, METHOD OF INTERCHANGING DATA VIA SUCH A DMA CONTROLLER

(75) Inventors: Patrice Couvert, Saint-Marcellin (FR); Xavier Cauchy, Laval (FR); Anthony Philippe, Grenoble (FR); Sébastien Ferroussat, Amberieu en Bugey (FR)

(73) Assignee: STMicroelectronics SA, Montrouge (FR)

( * ) Notice: Subject to any disclaimer, the term of this patent is extended or adjusted under 35 U.S.C. 154(b) by 516 days.

(21) Appl. No.: 11/752,822

(22) Filed: May 23, 2007

(65) Prior Publication Data
US 2008/0005390 A1  Jan. 3, 2008

(30) Foreign Application Priority Data

May 24, 2006  (FR) ...................... 06 04673

(51) Int. Cl.
*G06F 13/28* (2006.01)
*G06F 17/50* (2006.01)

(52) U.S. Cl. .......... 710/22; 710/308; 711/100; 711/147; 716/138

(58) Field of Classification Search .................. None
See application file for complete search history.

(56) References Cited

U.S. PATENT DOCUMENTS

| | | | | |
|---|---|---|---|---|
| 5,889,949 A * | 3/1999 | Charles | .......................... | 709/214 |
| 6,493,803 B1 * | 12/2002 | Pham et al. | .................... | 711/147 |
| 6,526,462 B1 * | 2/2003 | Elabd | .......................... | 710/242 |
| 6,657,633 B1 * | 12/2003 | Casey | .......................... | 345/530 |
| 6,801,219 B2 * | 10/2004 | Colavin | ........................ | 345/684 |
| 6,851,047 B1 * | 2/2005 | Fox et al. | .......................... | 713/1 |
| 6,889,226 B2 * | 5/2005 | O'Neil et al. | ......................... | 1/1 |
| 7,034,868 B2 * | 4/2006 | Sasaki | ........................ | 348/222.1 |
| 7,051,313 B1 * | 5/2006 | Betz et al. | ..................... | 716/113 |
| 7,107,374 B1 * | 9/2006 | Stadler | .......................... | 710/107 |
| 7,401,257 B2 * | 7/2008 | Usui | .............................. | 714/27 |
| 7,475,182 B2 * | 1/2009 | Matsuse et al. | ............... | 710/308 |
| 7,631,114 B2 * | 12/2009 | Kamada et al. | .................. | 710/22 |
| 7,716,389 B1 * | 5/2010 | Bruce et al. | ..................... | 710/22 |
| 7,793,012 B2 * | 9/2010 | Kaneko | .......................... | 710/24 |

(Continued)

OTHER PUBLICATIONS

"ADM5120 Network Processor V1.16" Data Sheet, Rev 1.1, copyright 2005 by Infineon Technologies.*

(Continued)

*Primary Examiner* — Henry Tsai
*Assistant Examiner* — Steven Snyder
(74) *Attorney, Agent, or Firm* — Lisa K. Jorgenson; Thomas J. Satagaj; Seed IP Law Group PLLC

(57) ABSTRACT

A system on chip comprises a CPU, a local memory a data processing module, and a DMA controller. The DMA controller comprises a first interface to handle data transmissions, to and from the local memory, associated with an indication to the local memory of an address in local memory, and is designed to perform data writes and reads in the local memory via this interface. The DMA controller also comprises a second interface, which in response to a command received from the central processing unit, operations for writing and reading data in the local memory via the first interface. The DMA controller also comprises a third interface with the processing module to transmit to it the data read, via the first interface, in the local memory, this transmission not being associated with an indication to the processing module, by the DMA controller, of an address.

19 Claims, 2 Drawing Sheets

U.S. PATENT DOCUMENTS

| | | | |
|---|---|---|---|
| 2002/0054229 A1* | 5/2002 | Sasaki | 348/312 |
| 2003/0200373 A1* | 10/2003 | Kent | 710/305 |
| 2004/0010652 A1 | 1/2004 | Adams et al. | 710/313 |
| 2004/0216018 A1* | 10/2004 | Cheung | 714/724 |
| 2005/0177655 A1 | 8/2005 | Hein | 710/22 |
| 2005/0216614 A1* | 9/2005 | Sakairi | 710/22 |
| 2005/0226324 A1* | 10/2005 | Ouyang et al. | 375/240.12 |
| 2006/0090017 A1* | 4/2006 | Kim et al. | 710/22 |
| 2006/0161720 A1* | 7/2006 | Bai et al. | 711/100 |
| 2007/0006035 A1* | 1/2007 | Usui | 714/38 |
| 2007/0130409 A1* | 6/2007 | Matsuse et al. | 710/308 |

OTHER PUBLICATIONS

"ADM5120 System on Chip (SoC) Network Controller" Product Brief, copyright 2004 by Infineon Technologies.*

* cited by examiner

DMA CONTROLLER, SYSTEM ON CHIP COMPRISING SUCH A DMA CONTROLLER, METHOD OF INTERCHANGING DATA VIA SUCH A DMA CONTROLLER

BACKGROUND

1. Technical Field

The present invention relates to integrated systems on silicon chip, or SoC ("System On Chip"), comprising at least one central processing unit, or CPU, on which programs can be run, a direct memory access, or DMA, controller, and a local memory.

The present invention relates more particularly to such systems in which successive processes, for example using algorithms, are applied to input data, typically digital audio and/or video data. Such SoCs are, for example, included in electronic appliances such as set-top-boxes, personal digital assistants (PDA), mobile phones, and so on.

2. Description of the Related Art

With the dimensions of the processing cores reducing as their processing capabilities increase, one trend is to carry out a maximum of processes via software applications, the hardware components, for example the logic gates, being used only when particularly high processing performance levels, in terms of bit rate in particular, are required.

In practice, the use of software applications allows the use of algorithm languages with a high level of abstraction, for example "C" language, which facilitates the design step. Furthermore, errors are corrected in software applications simply by loading a new code.

One trade-off between the advantages of software implementations and those of hardware implementations is to combine both aspects within one and the same system, then called "firmware", in which the system comprises on the one hand modules comprising hardware components and on the other hand software applications which are run on the CPU, the tasks to be performed by the system being divided between the hardware modules and the software applications. When executing instructions that are part of these software applications, the CPU interacts with the hardware modules, for example by sending commands to these modules. These commands use, for example, successive processes carried out by the hardware modules, for example of digital filtering, image processing, speech recognition, MPEG encoding/decoding, and other such types, on the digital data received as input to the system.

The hardware modules of the "firmware" type systems therefore receive data as input, carry out processes on this received data, and deliver the processed data as output.

It is also necessary to optimize the processing times of the software applications that the CPU applies to the data which is stored in the local memory of the system, which the CPU accesses quickly. However, in most systems on chip, it is not possible to store in local memory all the data that needs to be processed by the system on chip, for example, all the image data in the case of a system working on images. One, or even several, mass storage memories (for example, disks), hereinafter designated external memories, thus store at respective addresses in the external memories, data intended for processing by the CPU of the system on chip.

The function of the DMA controller of the system on chip is to transfer data from the external memory to the local memory, when this data is needed for the processing currently being carried out by the CPU. Similarly, the function of the DMA controller is to release storage resources in the local memory by transferring data from the local memory to the external memory. The data is thus transferred from memory to memory, from a source address in one memory to a destination address in another memory.

Moreover, in some cases, the data to be processed by the hardware modules is interchanged with the hardware modules via dedicated interfaces of the processor, normally called "streaming" interfaces, each comprising an input port named SDI (Streaming Data In) and an output port named SDO (Streaming Data Out), and a register associated with each of these ports. Each of these ports normally consists of a data bus and a few synchronization signal channels.

Such a configuration is represented in FIG. 1. The "firmware" type system on chip SP1 comprises a CPU 1, hardware modules 2 and 3. The system SP1 has access under control of the CPU 1 to an external or local memory 6. The CPU 1 comprises a register 4 (respectively 5) linked to the hardware module 3 via the output port SDO1 (respectively the input port SDI1). The CPU 1 also comprises a register 4' (respectively 5') linked to the hardware module 2 via the output port SDO2 (respectively the input port SDI2).

The writing, controlled by the CPU 1, in the register 4 (respectively 4'), of data from the memory 6, has the effect of applying this written data to the port SDO1 (respectively SDO2). The CPU 1 can then control the writing in the register 4 (respectively 4'), of new data from the memory 6 which will, also, be applied to the port SDO1 (respectively SDO2). The reading, controlled by the CPU 1, of the register 5 (respectively 5') has the effect of supplying the data then applied to the port SDI1 (respectively SDI2). The writing in the memory 6 of this data is then controlled by the CPU 1.

In some cases, one and the same port can be used for reading and writing.

This solution for supplying input data and recovering output data from the hardware modules is not suitable for large volumes of data because it requires intensive involvement from the CPU.

In other configurations, each hardware module comprises its own DMA controller. For example, the "firmware" system SP2 diagrammatically represented in FIG. 2 comprises a CPU 7 and two hardware modules 8 and 9. The CPU 7 controls access to an external memory 6 via DMA controllers. The hardware modules 8 and 9 in practice each comprise a DMA controller 8' and 9'. The DMA controller of each hardware module can thus be used to read the data to be processed in the mass memory 6, then, once this data has been processed by the hardware module, to write the data obtained in the mass memory 6. However, this solution increases the cost of the hardware modules. It also constitutes an obstacle to the granularity of the hardware modules. For example, a hardware module comprising a DMA controller carries out two successive processes on the input data, for example a temporal interpolation and a spatial interpolation of image data. If there is a desire to divide it into two hardware modules, one carrying out the temporal interpolation and the other the spatial interpolation, in order for certain data to be able to be subjected to just one of the two processes, it is then necessary to add a DMA controller.

There is therefore a need for a solution to supply input data and collect output data from the hardware modules of a "firmware" type system on chip, reducing the drawbacks of the prior art.

BRIEF SUMMARY

One embodiment of the invention proposes a DMA controller of a system on chip, comprising:
- a first interface with a local memory of the system on chip designed to handle data transmissions to and from the local memory, said transmissions being associated with an indication to the local memory of an address in local memory;
- a second interface with a central processing unit of the system on chip.

The DMA controller is designed to perform, in response to a command received from the central processing unit, operations for writing and reading data in the local memory via the first interface.

The DMA controller also comprises at least one third interface with a data processing module of the system on chip. This third interface is:
- designed to transmit, to the processing module, data read via the first interface in the local memory, the transmission not being associated with an indication to the processing module, by the DMA controller, of a storage address of said data; and/or
- designed to receive data delivered by the processing module and to transmit to the local memory the data received via the first interface, said reception not being associated with a prior indication to the processing module, by the DMA controller, of the storage address of said data.

Such a DMA controller can thus be used to interchange data with the data processing hardware modules of a system on chip, thereby not requiring more than a minimum intervention from the CPU. No storage address is supplied by the DMA controller to the processing modules in the data interchanges. This makes it possible to advantageously exploit the functionalities for reading and/or writing data, in the local memory, of the DMA controller used by the CPU. In case of transmission to the processing hardware module, the data is transmitted to it without there being an operation to write in any memory of the hardware module. In particular, there is no delivery, to the processing module selected for the transfer, of destination addresses for the transmitted data traditionally associated with a write operation via a bus.

In case of reception of data from the processing hardware module, the data is delivered without there being a read operation in any memory of the hardware module. In particular, there is no delivery, to the processing module selected for the transfer, of data source addresses.

In an embodiment, the DMA controller is designed, on receipt of at least one command from the central processing unit indicating parameters including a storage address and a data size, to read successively via the first interface data stored in local memory at addresses determined as a function of said parameters, and to transmit successively the read data to the processing module via the third interface.

This arrangement makes it possible to supply the processing module with a stream of data (for example, the pixels of an entire image) without requiring the intervention of the CPU, which enables the performance of the system on chip to be improved and is particularly well suited to the way the hardware modules in a "firmware" type system operate.

Advantageously, the DMA controller is designed, on receipt of at least one command from the central processing unit indicating parameters including a storage address and a data size, to write successively into the local memory, via the first interface, the data delivered by the processing module at addresses determined as a function of said parameters.

This arrangement thus allows for the recovery of a data stream (for example the pixels of an entire image) processed by the processing module without requiring the intervention of the CPU, which enables the performance of the system on chip to be improved and is particularly well suited to the way the hardware modules in a "firmware" type system operate.

In an embodiment, the DMA controller is designed, on receipt of at least one command from the central processing unit indicating a channel width, to adjust the width of at least one data interchange channel between the third interface and the processing module to said indicated width. This characteristic thus makes it possible to adapt the third interface to the specifics of the hardware module with which it is associated, as will be explained in the description below.

In an embodiment, the transmitted data includes data describing image pixels and information indicating the position of at least one pixel in an image, the processing performed by the processing module being performed as a function of said information.

Thus, the processing of the image data by the hardware module is performed according to information received with this image data.

In an embodiment, the DMA controller also comprises a fourth interface with a memory external to the system on chip, the DMA controller being designed to perform operations to write and read data in the external memory via this fourth interface.

Thus, the data read in the external memory by the DMA controller can be routed via the local memory from the DMA controller to the processing module, with an intervention from the CPU reduced to the minimum. Similarly, the data processed by the processing module and delivered to the DMA controller can be written in external memory by the DMA controller.

Another embodiment of the invention proposes a system on chip comprising a local memory, a central processing unit, a processing module; and a DMA controller according to the first embodiment of the invention.

Another embodiment of the invention proposes a method of interchanging data with a processing module of a system on chip also comprising a local memory, a central processing unit and a DMA controller.

The DMA controller comprises a first interface with the local memory designed to handle data transmissions to and from the local memory, said transmissions being associated with an indication to the local memory of an address in local memory;

and a second interface with the central processing unit, and being designed to perform, in response to a command received from the central processing unit, operations to write and read data in the local memory via the first interface; and at least one third interface with the processing module; said method comprising at least one of the following two steps a/ and b/:

a/ transmitting from the DMA controller, to the processing module, data read via the first interface of the DMA controller in the local memory, the transmission not being associated with an indication, to the processing module by the DMA controller, of a storage address of said data;

b/ receiving on the third interface data transmitted by the processing module and supplying via the third interface to the first interface received data in order to write the received data in the local memory, said reception of the transmitted data not being associated with a prior indication to the processing module, by the DMA controller, of a storage address of said data.

BRIEF DESCRIPTION OF THE SEVERAL VIEWS OF THE DRAWINGS

Other characteristics and advantages of the invention will become apparent from reading the description that follows. This is purely illustrative and should be read in light of the appended drawings in which.

DETAILED DESCRIPTION

Figure 1:
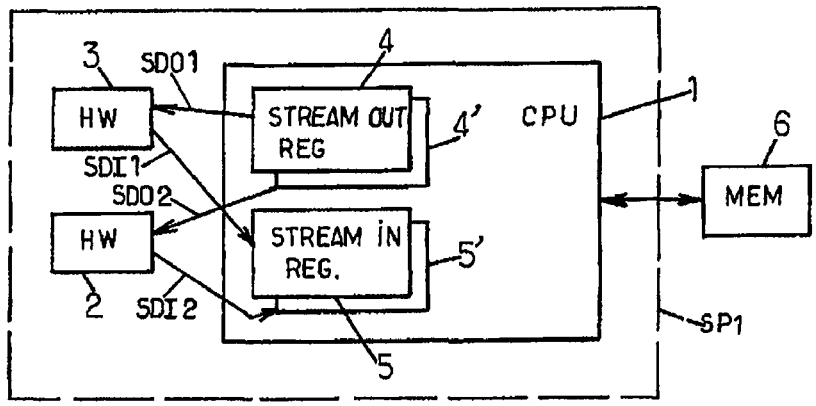
FIG. 1 illustrates a system on chip with streaming interfaces.
Figure 2:
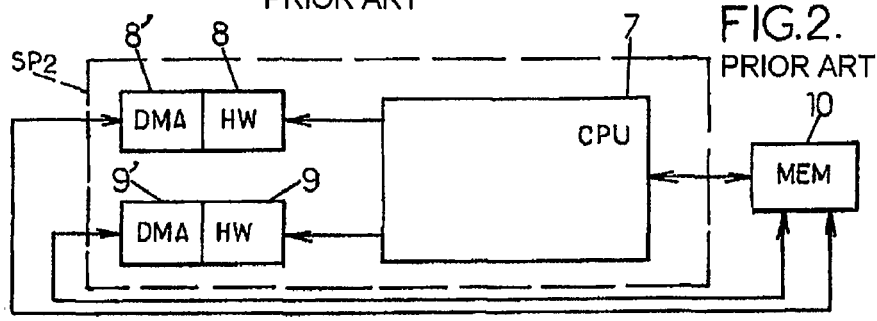
FIG. 2 illustrates a system on chip with each hardware module having its own DMA controller.
Figure 3:
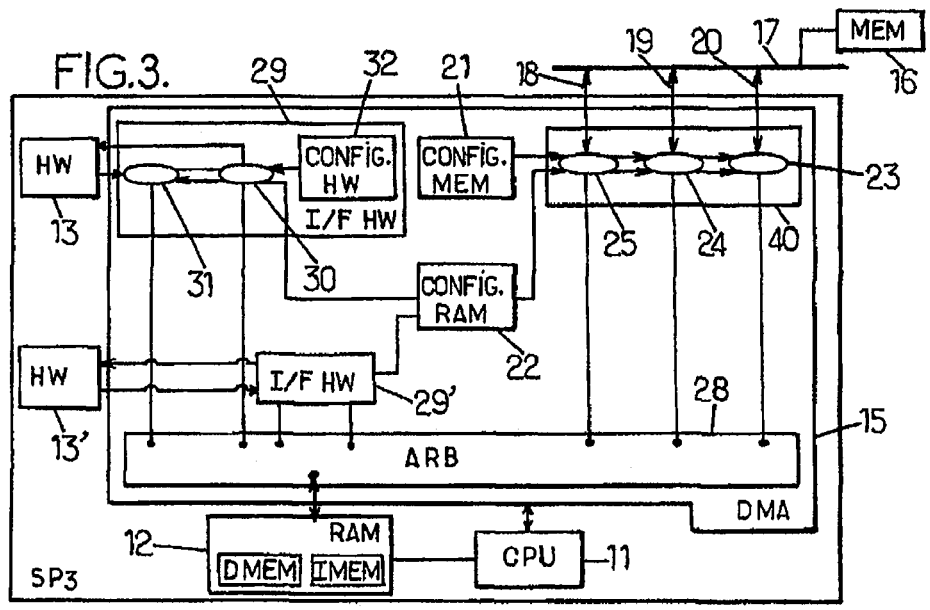
FIG. 3 is a system on chip in an embodiment of the invention.

FIG. 3 shows a system on chip SP3 in an embodiment of the invention. The system on chip SP3 is a firmware type system carrying out data processes, in the case of the present example, on image data. It comprises a CPU 11, a local memory 12, for example of RAM type, a plurality of hardware modules HW, only two of which, referenced 13, 13', are represented and a DMA controller 15.

The system on chip SP3 is coupled with an external memory 16 via an interconnect system comprising a central interconnect bus 17 and three physical data or address channels 18, 19, 20.

The central interconnect bus 17 is a physical channel comprising three logical channels respectively associated with the physical channels 18, 19, 20.

The RAM 12 comprises a part of memory IMEM in which the instructions of a software application A are stored and a part of memory DMEM in which image data is stored. In another embodiment, IMEM and DMEM are two separate memories.

The DMA controller 15 comprises a configuration block 22 associated with the RAM 12, a configuration block 21 associated with the external memory 16, a transaction module 40 between the RAM 12 and the external memory 16 and an arbitration module 28.

Each configuration block 21, 22 contains a certain number of registers, including at least one source register, one destination register and one size register.

The transaction module 40 is designed to control the data writes in external memory 16, via control blocks 23, 24, 25 and according to information contained in the configuration block 21 associated with the external memory, comprising the application of data or addresses on the channels 18, 19, 20, to supply the central interconnect bus 17 and to control data reading in external memory 16, comprising the extraction of data or addresses applied to the channels 18, 19, 20 and from the external memory 16.

The transaction module 40 is also designed to control data writes and reads in the RAM 12, via the control blocks 23, 24, 25, according to information contained in the configuration block 22 associated with the RAM and the arbitration module 28.

Some of the image processes performed by the system on chip SP3 are performed by the software application A and other processes are performed by the hardware modules HW.

The hardware module HW 13 comprises, for example, in the case considered here, components designed to perform an operation to offset pixels in the images, then a filtering operation on these pixels once shifted. The hardware module HW 13' comprises, for example, components designed to perform a spatial interpolation operation on the pixels in the images.

The software application A is used to perform an MPEG decoding and to control transfers to the controller and to control and supervise the hardware blocks of the system on chip SP3, including the hardware blocks 13 and 13'.

The image data stored by the memory DMEM 12 and external memory 16 are image pixels.

The system on chip SP3 has a standard N-bit architecture. Each address of the external memory 16 or of the DMEM 12 takes the form of a number encoded on $N_b$ bits. At each address, the data representing a number $n_p$ of pixels of an image is stored, arranged in a predetermined order.

In a manner known per se, on execution of instructions of the software application A, stored in the IMEM part of the RAM 12 and controlling a transfer between the external memory 16 and the DMEM part of the RAM 12, by the execution of "STORE" type instructions, for example, the CPU 11 successively obtains, from the DMA controller 15, the storage of a source address Ad_SRC of the transfer in a source register of the configuration block 21 of the external memory 16, the storage of a destination address Ad_DST in a destination register of the configuration block 22 of the RAM 12, and finally the storage of the size t of the transfer in the size register of each of the configuration blocks 21 and 22.

Then, the CPU 11 orders the DMA controller 15 to start the transfer. The transaction module 40 obtains from the external memory 16, the reading of the data contained at the address Ad_SRC stored in the source register of the configuration block 21 of the external memory 16. To do this, it transmits to the external memory 16 a read command ("READ") having as an argument the stored address Ad_SRC, via one of the channels 18, 19 or 20.

Then, it next transmits a similar read command for the data stored at each of the addresses located between the address Ad_SRC+1 and the address Ad_SRC+t−1.

In response to this command, the data D_SRC stored at the address Ad_SRC and the data D_(SRC+1) to D_(SRC+t−1) stored at each of the successive addresses located between the address Ad_SRC+1 and the address Ad_SRC+t−1 is applied in turn to the central interconnect bus 17 and collected by one of the physical channels 18, 19, 20, under the control of the transaction module 40. Then it is supplied successively to the arbitration module 28 for writing into the RAM 12. Via the arbitration module 28, which manages arbitration conflicts between several write requests (and/or read requests in other cases) in the RAM 12, write commands are successively transmitted to the RAM 12. Each write command has as its first argument the data to be stored D_SRC+n, for n between 0 and t−1, and as its second argument the address Ad_DST+n, at which this data must be stored in the RAM 12. The reference address Ad_DST has been defined in the destination register of the configuration block 22 associated with the RAM.

Once the transfer is completed, the DMA controller 15 notifies the CPU 11 of this fact by an interrupt.

Since the DMA controller 15 is designed to interchange data with the external memory 16 using a physical bus 17 comprising three logical channels, DMA controller 15 is capable of managing in parallel three transfer operations with the external memory 16.

The configuration block 21 associated with the external memory 16 therefore comprises three source registers, three destination registers and three size registers.

The use of the DMA controller 15 thus makes it possible to perform the data transfer, without the intervention of the CPU during the transfer operation itself. The CPU can therefore continue with its processes in parallel with the current data transfer.

In an embodiment of the invention, the DMA controller also comprises a plurality of hardware modules HW, each interfaced with a respective hardware module.

FIG. 3 shows the interface modules 29 and 29', respectively interfaced with the hardware modules 13 and 13'.

Interchanges, in an embodiment of the invention, between the hardware module 13 and the interface module 29 will now be described below. Similar interchanges are implemented between the other interface modules and the hardware modules that are respectively associated with them.

The hardware module 13 comprises four receive ports req_in, next_valid_in, flag_in and pixel_in and four transmit ports req_out, next_valid_out, flag_out and pixel_out, intended for the interchanges with the DMA controller 15.

The interface module 29 comprises a configuration block 32 associated with the hardware module 13, four receive ports req_in', next_valid_in', flag_in' and pixel_in' and four transmit ports req_out', next_valid_out', flag_out' and pixel_out'. These transmit and receive ports are intended for the interchanges with the hardware module 13. The configuration block 32 associated with the hardware module 13 comprises a size register.

Figure 4:
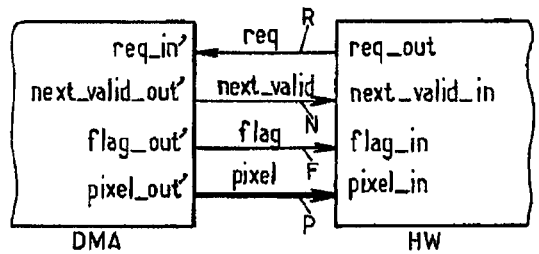
FIG. 4 represents the interchanges between a hardware module and the DMA of the system on chip represented in FIG. 3 to supply data to the hardware module.
Figure 5:
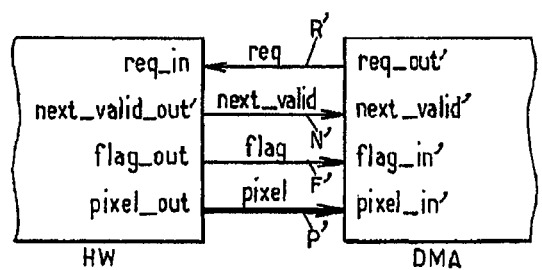
FIG. 5 represents interchanges between a hardware module and the DMA of the system on chip represented in FIG. 3 to recover data from the hardware module.

As shown in FIG. 5, the receive ports of the hardware module 13 req_in, next_valid_in, flag_in and pixel_in are linked by respective channels R', N', F' and P' to the corresponding transmit ports of the interface module 29, respectively req_out', next_valid_out', flag_out' and pixel_out'. Also as represented in FIG. 4, the receive ports of the interface module 29 req_in', next_valid_in', flag_in' and pixel_in' are linked by respective channels R, N, F and P to the corresponding transmit ports of the hardware module 13, respectively req_out, next_valid_out, flag_out and pixel_out.

These data interchange channels are dedicated to the interchanges between the hardware module 13 and the interface module 29.

The interface module 29 is also designed to control the supply to the hardware module 13 of data read in the RAM 12, via control blocks 30, 31 and according to information contained in the configuration block 32 associated with the hardware module 13.

The interface module 29 is also designed to control the reception of data transmitted by the hardware modules 13 and the writing of the received data in the DMEM part of the RAM 12, via the control blocks 23, 24, 25, of the RAM configuration block 22 and of the arbitration module 28.

Thus, when executing instructions of the software application A, stored in the IMEM part of the RAM 12 and controlling the execution by the hardware module 13 of the processes for offsetting pixels in the images, then filtering, the CPU 11 successively requires, from the DMA controller 15, the storage of a source address Ad_SRC in a source register of the configuration block 22 associated with the RAM 12 and the storage of the size T of the transfer in the size register of each of the configuration blocks 22 and 32.

Then, the CPU 11 orders the DMA controller 15 to start reading the data block of size T stored from the address Ad_SRC, the size T and the address Ad_SRC being defined in the size and source registers of the configuration block 22, then to transmit the read data to the hardware module 13.

The interface module 29 then requests from the arbitration block 28 the reading of the data contained at the address Ad_SRC in the DMEM part of the RAM 12. To do this, a read command ("READ") having as an argument the stored address Ad_SRC is then transmitted to the RAM 12. The data stored at the address Ad_SRC in the RAM 12 is then read.

With reference to FIG. 4, the CPU having sent a signal requesting the hardware module 13 to receive data and process this data, a request signal "req" is transmitted by the hardware module 13 from its port req_out (for example, by setting the corresponding channel to the high state) indicating that it is ready to receive data.

This request is received by the interface module 29 on its port req_in'. In response, the interface module 29 sends a signal "next_valid" (for example, by setting the corresponding channel to the high state), responding to it that it is ready to send data, on its port next_valid_out'. The hardware module 13 receives this signal on its port next_valid_out.

The interface module 29 sends from its transmit port flag_out', in parallel with this response signal, information named "flag" below relating to the data to be transmitted, encoded in the present case on 64 bits. This information indicates the characteristics of the data to be transmitted, relative to its position in the image: it indicates, for example, whether the data to be transmitted next relates to the first or the last row of pixels in an image, whether it is the first pixel or the last pixel of a row. This information is received by the hardware module 13 on its port flag_in.

The interface module 29 then sends from its transmit port pixel_out' the data relating to the first pixel, encoded on 8 bits, named "pixel" below and contained in the data read at the address Ad_SRC relating to $n_p$ pixels.

This data is received by the hardware module 13 on its receive port pixel_in.

Once the data has been received, the same interchange procedure is renewed $n_p-1$ times between the hardware module 13 and the interface module 29, to transmit the $n_p$ pixels read at the address Ad_SRC one pixel at a time.

Figure 6:
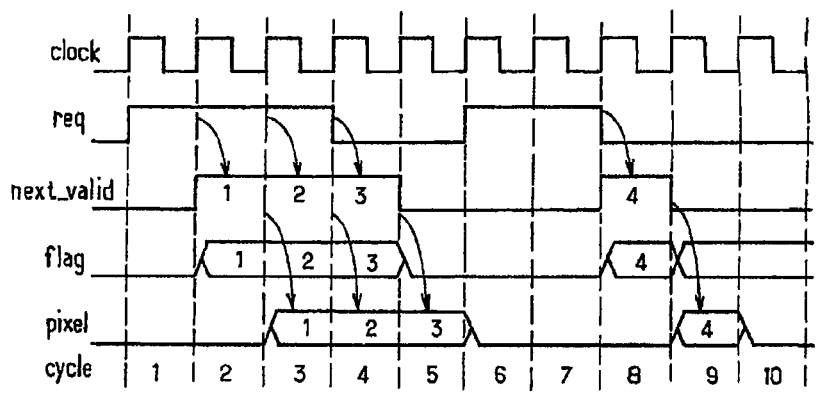
FIG. 6 is a timing diagram illustrating the implementation of the interchanges represented in FIGS. 4 and 5.

FIG. 6 shows a timing diagram showing the succession of "req", "next_valid", "flag" and "pixel" signals sent in each cycle in turn (one clock cycle corresponding to a phase in the high state and a phase in the low state) and relating to the transmission of the data relative to four successive pixels numbered 1, 2, 3 and 4.

The request signal sent in the cycle n°6 for the fourth pixel not having obtained a response to the following cycle (cycle n°7), the request signal is repeated in the seventh cycle.

The interface module 29 then transmits successive commands to read in the RAM 12, similar to that described above, for the data stored at each of the addresses located between the address Ad_SRC+1 and the address Ad_SRC+T−1. Each read is followed by the transmission, one pixel at a time, to the hardware module of the data read in the RAM 12. The transmission is completed when T blocks of pixel data, T being defined in the size register of the configuration block 32 associated with the hardware module 13, have been transmitted. Once the transfer is completed, the interface module 29 notifies the CPU 11 of this by an interrupt.

The data received in this way successively by the hardware module is then subjected to the offset and filtering operations performed by the hardware module 13. These operations are performed in particular according to "flag" information transmitted over the channel F.

Thus, the data read in the RAM 12 is transmitted by the DMA controller 15 to the hardware module 13, and this without a write command, with the supply of a destination address for writing this data, being supplied by the DMA controller 15 to the hardware module 13.

This makes it possible to feed the hardware module 13 with data to be processed, read in the RAM 12. This data has, for example, previously been extracted from the external memory 16 as part of a conventional DMA transfer taking place from the external memory 16 to the RAM 12.

This supply of data to the hardware module requires the consumption of very little in the way of processing resources of the CPU 11.

Once the data has been processed by the hardware module 13, that is, it has been subjected to the offset and filtering operations applied by the hardware module, the latter notifies the CPU 11 of this, for example by an interrupt.

The receipt of this interrupt by the CPU 11 provokes the execution of instructions of the software application A, stored in the IMEM part of the RAM 12, following which the CPU then requires successively, from the DMA controller 15, storage of a destination address Ad_DST in the destination register of the configuration block 22 associated with the RAM 12 and the storage of the size T of the transfer in the size register of each of the configuration blocks 22 and 32.

Then, the CPU orders the hardware module 13 to start transmitting all the processed data.

On command from the CPU, and with reference to FIG. 5, a request signal "req" is transmitted by the interface module 29 from its port req_out' (for example, by setting a channel to the high state), indicating that it is ready to receive data.

This request "req" is received by the hardware module 13 on its port req_in. In response, the hardware module 13 sends, from its port next_valid_out, a "next_valid" signal indicating that it is ready to send data. The interface module 29 receives this signal on its port next_valid_in'.

The hardware module 13 sends from its transmit port flag_out, in parallel with this response signal, "flag" information relating to the data to be transmitted encoded in this case on 64 bits, for example information indicating whether the data to be transmitted next relates to the first or the last row of pixels in an image, whether it is the first pixel or the last pixel of a row. This information is received by the interface module 29 on its port flag_in'. The hardware module 13 then sends from its transmit port pixel_out the "pixel" data relating to the first pixel processed, encoded on 8 bits.

This data is received by the interface module 29 on its receive port pixel_in'.

Once the data has been received, the same interchange procedure is renewed, as long as there remains processed data to be sent, that is, $(n_p-1+(T-1)*n_p)$ times between the hardware module 13 and the interface module 29, (T being defined in the size register of the configuration block 32 associated with the hardware module 13) enabling in all, the pixel-by-pixel transmission of $T*n$ pixels.

Once it has received the processed data relating to n first pixels, the interface module 29 then asks the arbitration block 28 to write, in the DMEM part of the RAM 12, this data at the address Ad_DST, as defined in the destination register in the configuration block 22. To do this, a write command ("WRITE") having as an argument the address Ad_DST is then transmitted to the RAM 12. The processed data relating to the n pixels is then stored at the address Ad_DST in the RAM 12.

Then these steps for collecting data relating to n pixels and writing this data in the RAM 12 are repeated T−1 times, T being defined in the size register of the configuration block 22 associated with the RAM, in order to store the data in the RAM 12 at the addresses located between Ad_DST and Ad_DST+T−1.

Once the transfer is completed, the interface module 29 notifies the CPU 11 of this by an interrupt.

As can be seen, the data processed by the hardware module 13 is thus transmitted by the DMA controller 15 and written in the RAM 12, and this without a read command, with the supply of a source address indicating where to read this data in a memory of the hardware module 13, being supplied to the latter by the DMA controller 15.

This makes it possible to collect the data processed by the hardware module 13 and store it in RAM 12. A conventional DMA transfer conducted from the RAM 12 to the external memory 16 can then unload the RAM 12.

Such a DMA controller makes it possible to supply data to a plurality of hardware modules. The selection of the hardware module with which a data interchange is to be conducted is made implicitly by the CPU, when it fills the registers in the configuration block associated with said hardware module.

Such a DMA controller can be adapted easily to a variable number of hardware modules, since all that is needed is to add, if necessary, interface modules or connect the transmit and receive ports of one and the same interface to several hardware modules.

In an embodiment of the invention, the DMA controller comprises one or more physical interface modules HW.

Also, a physical interface module HW in the system on chip can form from 1 to n logical interface modules (for example n=4). Each logical module comprises on the one hand a configuration block associated with a dedicated hardware module and the registers of this block and on the other hand the transmit and/or receive ports designed to be interfaced with the hardware modules. The maximum number n of logical modules is determined on hardware implementation of the system. The logical modules actually used are indicated by the CPU as part of the execution of the software application A and the registers of the configuration block in each logical module indicated in this way are then completed. Each logical interface module then acts as one of the interface modules HW of the type of the interface modules 29 or 29' described above. The resources designed to interchange with the hardware modules of the physical interface module HW are then distributed in time between the various logical interface modules, each logical interface module benefiting from said resources for a predetermined time, to interchange with the hardware module to which it is dedicated.

This arrangement makes it possible to adapt the DMA controller according to the instructions to be executed by the CPU 11.

In an embodiment of the invention, in an interface module of the type of the interface module 29, for example, the configuration block associated with the hardware module comprises a configuration register for the channel P linking the ports pixel_in and pixel_out', and/or a configuration register for the channel P' linking the ports pixel_in' and pixel_out, designed to transport the data representative of the pixels. Also, the CPU is designed to store in at least one of these registers, for example the configuration register of the channel P, a value setting the width of the channel P (typically 8, 16, 32 or 64 bits) before each transfer controlled by the CPU in order to transmit to the hardware module 13.

Such an arrangement makes it possible to have a first hardware module supplying a first interface module HW associated with it with data encoding each pixel on one byte for example, and a second hardware module supplying a second interface module HW that is associated with it with data encoding each pixel on 32 bits for example, coexisting in one and the same system. This arrangement is particularly useful for adapting to the output or input formats of the data used in the hardware modules, in the case where the first interface module and the second interface module are both logical emanations of one and the same physical interface module.

This arrangement also makes it possible to adapt to the case where the software application orders data to be sent to a hardware module for a first processing and also orders data to be sent to the same hardware module for a second processing, the hardware module being designed to receive as input 8-bit words in the case of the first processing and 32-bit words in the case of the second processing.

In the embodiment described with reference to the figures, the interface module 29 is designed to receive data from the hardware module 13 and to transmit data to the hardware module 13. In an embodiment, the interface module 29 is designed to perform only one of these two operations.

One embodiment of the invention can also be used to interchange data, for example image data, between a "firmware" system, for example the system SP3 described above, and a hardware module external to the system SP3 and presenting a communication protocol similar to that presented by the hardware interface module 29 (in the case above, with the interchanges of "req", "next_valid", "flag" and "pixel" signals), the interchanges taking place between the hardware interface module 29 of the DMA controller of the "firmware" system and the external hardware module.

One embodiment of the invention can also be used to interchange data, for example image data, between a first "firmware" system and a second "firmware" system, the interchanges taking place between two hardware interface modules similar to the interface module 29, each included in the DMA controller of each "firmware" system.

One embodiment of the invention cascades, in a data processing subsystem, a first hardware module HW1, the output of which is linked to the input of a "firmware" type system SP as described above, the output of which is linked to a second hardware module HW2. The data stream is first received as input to the subsystem via the input of the first hardware module HW1.

In such a case, the DMA controller comprises a first interface module associated with the hardware module HW1, and a second interface module associated with the second hardware module HW2.

In an embodiment of the invention, the first interface module, interfaced with the hardware module HW1, comprises only the receive ports similar to the ports req_in', next_valid_in', flag_in' and pixel_in', and no transmit ports, since it is designed only to receive data from the module HW1 and not to transmit data to it. Also, the second interface module, interfaced with the hardware module HW2, comprises only transmit ports similar to the transmit ports req_out', next_valid_out', flag_out' and pixel_out', and no receive ports.

In an embodiment, the supply of the data of the first module HW1 to the "firmware" type system SP is implemented via a DMA controller of the system SP, and the supply of the data by this system SP to the hardware module HW2 is implemented via the DMA controller of the system SP, intermediate processes being possible by the system SP on the data received from the first hardware module HW1. The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Direct Memory Access (DMA) controller of a system on chip, comprising:
    a first interface structured to interface with a local memory of the system on chip, the first interface coupled to the local memory to pass first data to and from the local memory, said first data associated with an indication to the local memory of an address in the local memory;
    a second interface structured to interface with a central processing unit of the system on chip, said DMA controller operable to perform, in response to a command from the central processing unit, operations for writing and reading second data in the local memory via the first interface;
    a third interface structured to interface with a data processing module of the system on chip, said third interface being at least one of:
        operable to transmit to the data processing module third data read via the first interface in the local memory, the transmission from said third interface based at least in part on receipt of at least one first command from the central processing unit, and the transmission not being associated with a prior indication to the data processing module, by the DMA controller, of a first storage address of said third data; and
        operable to receive fourth data from the data processing module and further operable to transmit to the local memory via the first interface the received fourth data, said reception of the fourth data based at least in part on receipt of at least one second command from the central processing unit, and the reception not being associated with a prior indication to the data processing module, by the DMA controller, of a second storage address of said fourth data; and
    a fourth interface structured to interface with a memory external to the system on chip, the DMA controller operable to perform operations to write and read fifth data in the external memory via the fourth interface.

2. The DMA controller according to claim 1, wherein the at least one first command from the central processing unit indicates parameters including a storage address and a data size, and the first interface is structured to read successively data stored in the local memory at addresses determined as a function of said parameters, and to transmit successively the read data to the data processing module via the third interface.

3. The DMA controller according to claim 1, wherein the at least one second command from the central processing unit indicates parameters including a storage address and a data size, and the third interface is operable to write successively into the local memory, via the first interface, the data delivered by the data processing module at addresses determined according to said parameters.

4. The DMA controller according to claim 1, wherein the third interface is structured, on receipt of at least one command from the central processing unit indicating a channel width, to adjust a width of at least one data interchange channel between the third interface and the data processing module to said indicated channel width.

5. The DMA controller according to claim 1, in which the third data includes first information describing image pixels and second information indicating a position of at least one pixel in an image, the data processing module processing the third data as a function of said first and second information.

6. A system on chip comprising:
a local memory;
a central processing unit;
a processing module; and
a Direct Memory Access (DMA) controller that includes:
  a first interface structured to interface with the local memory of the system on chip and operable to pass first data to and from the local memory, said first data associated with an indication to the local memory of an address in the local memory;
  a second interface structured to interface with the central processing unit of the system on chip, said DMA controller operable to perform, in response to a command from the central processing unit, operations for writing and reading second data in the local memory via the first interface;
  a third interface structured to interface with the processing module, said third interface being at least one of:
    operable to transmit to the processing module third data read via the first interface in the local memory, the transmission from said third interface based at least in part on receipt of at least one first command from the central processing unit, and the transmission not being associated with a prior indication to the processing module, by the DMA controller, of a first storage address of said third data; and
    operable to receive fourth data from the processing module and further operable to transmit to the local memory the received fourth data via the first interface, said reception of the fourth data based at least in part on receipt of at least one second command from the central processing unit, and the reception not being associated with a prior indication to the processing module, by the DMA controller, of a second storage address of said fourth data; and
  a fourth interface structured to interface with a memory external to the system on chip, said DMA controller operable to perform operations to write and read fifth data in the external memory via the fourth interface.

7. The system on chip according to claim 6, wherein the at least one first command from the central processing unit indicates parameters including a storage address and a data size, and the first interface is structured to read successively data stored in the local memory at addresses determined as a function of said parameters, and to transmit successively the read data to the processing module via the third interface.

8. The system on chip according to claim 6, wherein the at least one second command from the central processing unit indicates parameters including a storage address and a data size, and the third interface is operable to write successively into the local memory, via the first interface, the data delivered by the processing module at addresses determined according to said parameters.

9. The system on chip according to claim 6, wherein the third interface is structured, on receipt of at least one command from the central processing unit indicating a channel width, to adjust a width of at least one data interchange channel between the third interface and the processing module to said indicated channel width.

10. The system on chip according to claim 6, in which the third data includes first information describing image pixels and second information indicating a position of at least one pixel in an image, the processing module processing the third data as a function of said first and second information.

11. A data interchange method, comprising:
reading data from a local memory of a system on chip using a first interface of a Direct Memory Access (DMA) controller of the system on chip, said reading being associated with an indication to the local memory of an address in the local memory;
at least one of the following two steps:
  transmitting from a second interface of the DMA controller to a data processing module the data read from the local memory, the transmitting based at least in part on receipt of at least one first command from a central processing unit of the system on chip, and the transmitting not being associated with an indication, to the data processing module by the DMA controller, of the address of said data in the local memory, and;
  receiving at the second interface data transmitted by the data processing module and supplying via the second interface to the first interface the received data in order to write the received data to the local memory, said receiving of the data transmitted by the data processing module based at least in part on receipt of at least one second command from the central processing unit, and said receiving of the data transmitted by the data processing module not being associated with a prior indication to the data processing module, by the DMA controller, of a storage address of said data;
reading data from an external memory using a third interface of the DMA controller, the external memory being external to the system on chip; and
transmitting the data read from the external memory to the data processing module via the local memory of the system on chip.

12. The method according to claim 11, further comprising, in the case of transmitting from the second interface of the DMA controller to the data processing module:
transmitting from the central processing unit of the system on chip to the DMA controller the at least one first command, the at least one first command indicating parameters including a storage address and a size;
in response to receiving the at least one first command at the DMA controller, successively reading via the first interface data stored at addresses in the local memory determined as a function of said parameters; and
successively transmitting the successively read data to the data processing module via the second interface.

13. The method according to claim 11, further comprising, in the case of receiving by the second interface of data transmitted by the data processing module:
transmitting from the central processing unit of the system on chip at least one second command, the at least one second command indicating parameters including a storage address and a size;
in response to receiving the at least one second command, successively writing, via the first interface, data transmitted by the data processing module at addresses in the local memory determined as a function of said parameters.

14. A system, comprising:
an external memory; and
a system on chip coupled to the external memory, the system on chip including:
  a local memory;
  a central processing unit;
  a processing module; and a Direct Memory Access (DMA) controller that includes:
  a first interface structured to interface with the local memory of the system on chip and operable to pass data to and from the local memory, said data associated with an indication to the local memory of an address in the local memory;
  a second interface structured to interface with the central processing unit of the system on chip, said DMA controller operable to perform, in response to a command received from the central processing unit, operations for writing and reading the data in the local memory via the first interface; and
  a third interface structured to interface with the processing module, said third interface being at least one of:
    operable to transmit to the processing module the data read via the first interface in the local memory, the transmission from said third interface based at least in part on receipt of at least one first command from the central processing unit, and the transmission not being associated with an indication to the processing module, by the DMA controller, of a storage address of said data; and
    operable to receive the data delivered by the processing module and to transmit to the local memory the received data via the first interface, the reception of the data delivered by the processing module by the third interface based at least in part on receipt of at least one second command from the central processing unit, and the reception of the data delivered by the processing module not being associated with a prior indication to the processing module, by the DMA controller, of the storage address of said data; and a fourth interface structured to interface with the external memory, said DMA controller being designed to perform operations to write and read data in the external memory via the fourth interface.

15. The system of claim 14 wherein the system is at least one of a set-top box, a personal digital assistant, or a mobile phone.

16. The system of claim 14, wherein the at least one first command from the central processing unit indicates parameters including a storage address and a data size, and the first interface is structured to read successively data stored in the local memory at addresses determined as a function of said parameters, and to transmit successively the read data to the processing module via the third interface.

17. The system of claim 14, wherein the at least one second command from the central processing unit indicates parameters including a storage address and a data size, and the third interface is operable to write successively into the local memory, via the first interface, the data delivered by the processing module at addresses determined according to said parameters.

18. The DMA controller according to claim 1, wherein the third interface operable to transmit to the data processing module third data read via the first interface in the local memory is further operable to transmit to the data processing module information indicative of one or more characteristics of the third data read via the first interface that is to be transmitted to the processing module via the third interface.

19. The DMA controller according to claim 18, wherein the information indicative of one or more characteristics is indicative of at least one of whether the third data to be transmitted relates to a first or last row of pixels and whether the third data to be transmitted is the first or last pixel of a row.

* * * * *